United States Patent [19]
Bhandarkar et al.

[11] Patent Number: 5,344,475
[45] Date of Patent: Sep. 6, 1994

[54] MANUFACTURE OF HIGH PROOF-TEST OPTICAL FIBER USING SOL-GEL

[75] Inventors: Suhas D. Bhandarkar, Murray Hill, N.J.; Harish C. Chandan, Snellville, Ga.; David W. Johnson, Jr., Bedminster; John B. MacChesney, Lebanon, both of N.J.

[73] Assignee: AT&T Bell Laboratories, Murray Hill, N.J.

[21] Appl. No.: 29,750

[22] Filed: Mar. 11, 1993

[51] Int. Cl.$^5$ ............................................ C03B 37/025
[52] U.S. Cl. ........................................ 65/395; 65/134; 65/901; 65/416; 65/17.5; 65/17.3
[58] Field of Search ...................... 65/3.12, 3.11, 900, 65/901, 18.3, 18.1, 134

[56] References Cited

U.S. PATENT DOCUMENTS

| | | | |
|---|---|---|---|
| 5,078,768 | 1/1992 | Aggarwal et al. | 65/3.11 |
| 5,090,980 | 2/1992 | Clasen | 65/3.12 |
| 5,185,020 | 2/1993 | Satoh et al. | 65/3.11 |

FOREIGN PATENT DOCUMENTS 59-131538  7/1984  Japan ................................ 65/901

OTHER PUBLICATIONS

J. F. Knott, *Fundamentals of Fracture Mechanics*, London, Butterworths, pp. 98–105, 1973.
*Encyclopedia of Chemical Technology*, Kirk-Othmer, Sec. ed., vol. 4, pp. 710–758.

*Primary Examiner*—Robert L. Lindsay
*Attorney, Agent, or Firm*—George S. Indig

[57] ABSTRACT

Optical fiber drawn from preforms including sol-gel-derived glass is found to contain small refractory particles of the order of a micron in size. These particles initiate fiber breaks with the result that fiber may not meet proof-test tensile strength requirements. An effective separation method relies upon density and/or size difference from suspended sol particles for separation in the ungelled sol. A preferred separation procedure is centrifugation.

8 Claims, 1 Drawing Sheet

MANUFACTURE OF HIGH PROOF-TEST OPTICAL FIBER USING SOL-GEL

BACKGROUND OF THE INVENTION

1. Technical Field

The invention is concerned with the fabrication of silica-based optical fiber drawn from preforms which include sol-gel-produced glass. Early use is expected to take the form of low-loss single-mode fiber prepared from composite preforms constituted of sol-gel-produced overcladding tubes enclosing core rods prepared by usual fiber fabrication processes.

2. Description of the Prior Art

Co-pending U.S. patent application, Ser. No. 07/930,125, filed Aug. 14, 1992, represents the breakthrough to finally realize the economy implicit in use of sol-gel prepared silica-based glass bodies. In one use, tubular bodies, together with cores prepared by soot processing or by Modified Chemical Vapor Deposition, make up the composite preforms from which optical fiber may be drawn. That patent application describes incorporation of an organic polymer in the sol to avoid cracking of the gelled body during drying. Subsequent polymer removal during firing results in final drawn fiber of quality commensurate with that produced by more expensive methods now in use.

SUMMARY OF THE INVENTION

Intensive experimentation supports the initial objective—it has been demonstrated that resulting fiber is of the same loss characteristics as state-of-the-art fiber. However, a further problem has been identified. Fiber breakage due to discrete particles of contaminant reduces yield. These particles, which may be of 1 $\mu$m or smaller size—are inherently avoided during MCVD or soot processing.

Certain particles carried over from the liquid phase arc assimilated in the glass during following high temperature processing—before or during firing at $\approx 2200°$ C. $Al_2O_3$ is an example of such a harmless contaminant, which, since not retained as a discrete particle, does not initiate breakage. Particles which survive high temperature processing, and are of concern, are referred to as "refractory".

Claims are directed to removal of such particles—notably of $ZrO_2$ and $TiO_2$. Specific procedures depend on mechanical separation before gelation. Mechanical separation may be based on density and/or size difference to distinguish the unwanted particles from the $SiO_2$ particles which constitute the suspension, i.e., which constitute the aqueous sol. Settling, depending on density, and filtration, depending on size, is useful.

A preferred separation procedure depends on centrifugation for removal of offending particles. This approach is, at one time, sensitive both to density and size difference. Removal of refractories such as $ZrO_2$ and $TiO_2$ depends primarily on greater density relative to the $SiO_2$ particles which, in aqueous suspension, constitute the primary sol. At the same time, removal of agglomerates of $SiO_2$ particles, which may also serve for crack nucleation and as bubble centers, is based on larger size.

BRIEF DESCRIPTION OF THE DRAWING

The FIGURE depicts the centrifugation equipment used in the Examples. Generally descried as a "bottle" centrifuge, separated matter is collected as a cake at the bottom of the "bottle".

DETAILED DESCRIPTION

Co-Filed Application

Figure 1:
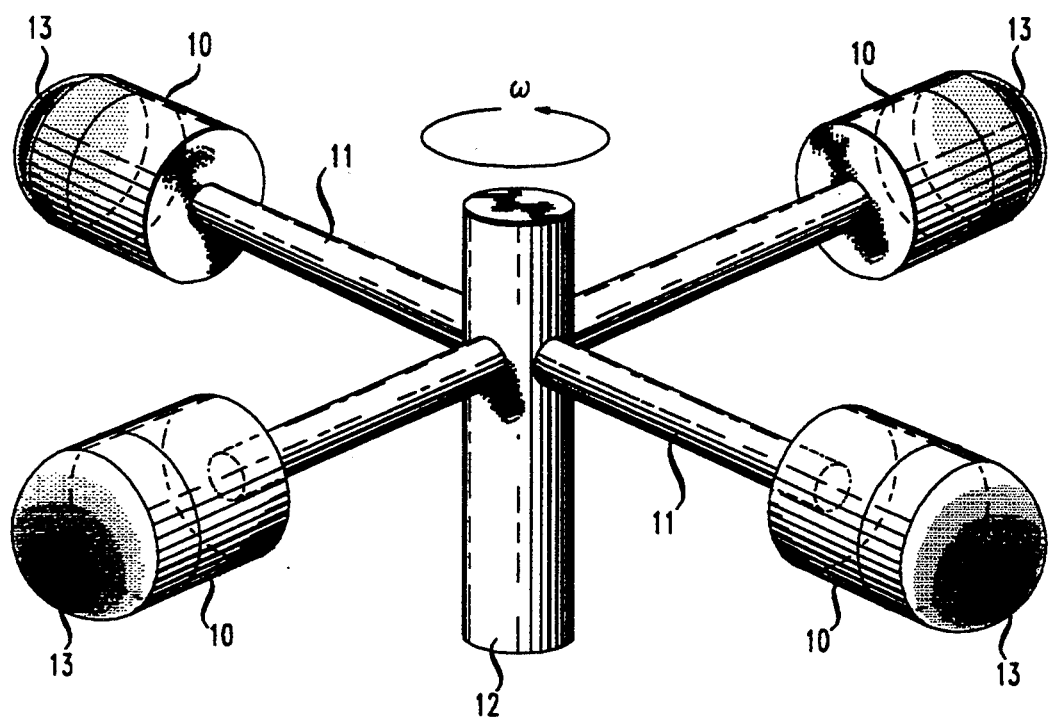

Co-filed U.S. patent application, Ser. No. 08/029,753, addresses the general problem of refractory particle removal in fiber made from preforms including sol-gel prepared portions. In accordance with that application, discrete refractory particles are reduced in size by gas treatment of the still-porous, dried gel. A preferred treatment uses $SOCl_2$, in $O_2$-free ambient, which reacts, e.g., with refractory $ZrO_2$ to remove Zr, ultimately as $ZrCl_4$.

The procedure of this co-filed application is extremely effective, but is expedited by removal of larger particles from the sol before gelling. Accordingly, it is contemplated that preferred commercial use might depend on the two procedures in combination. A final consideration—specific procedures of the examples of this invention operate on the sol, and, accordingly, cannot alleviate problems associated with contamination during gelation. The co-filed application, in being directed to removal of particles from the final gel, accounts for subsequent contamination.

General

The sol-gel procedure for production of overcladding does fulfill expectation. Fiber drawn from composite preforms, substituting sol-gel clad for earlier-used overcladding tubes, accomplishes the goal—loss properties of the drawn fiber are the same. However, strength is affected. In studied production, 100 kpsi proof-testing of fiber produced from earlier composite preforms resulted in twenty-five breaks per megameter of fiber. Of these, 85% were surface and core-overclad interface breaks, and only about 5% were due to particles internal to the overcladding. By contrast, 20 kpsi proof-testing of fiber drawn from a preform including a sol-gel derived overcladding, resulted in two internal breaks in 500 meters of fiber—a statistically insufficient sampling but necessitated by excessive breakage. These internal breaks were traced to 6 $\mu$m and larger size refractory particles in the overcladding—the "refractory" particles which survive drawing, to nucleate breaks.

There is a significant body of information concerning the breakage mechanism. (See, *Fundamentals of Fracture Mechanics*, J. F. Knott, London, Butterworths, pp. 98–105, 1973.) It is reported that "Griffith Cracks"—the relevant phenomenon resulting in fiber breakage due to flaw inclusion, relates size of break-nucleating particles, to tensile strain for a given fiber cross-section.

Required particle exclusion, both as to size and amount, depend on manufacturing specifications. Presence of a single 2 $\mu$m particle results in a break at 100 kpsi proof-test. A common single mode design requires thirty kg of overclad per 1000 km of fiber. A specification requirement of no more than five breaks per megameter (or five particles per megameter) is equivalent to removal of contaminant to a few parts per $10^{15}$.

Contamination has a variety of origins. In addition to the omnipresent $ZrO_2$, equally troublesome refractory particles of $TiO_2$ and $Cr_2O_3$ may be introduced during formation and dispersion of the $SiO_2$ sol particles. Both are sufficiently refractory to be retained during processing and to cause fiber breaks.

Centrifugation

Identification of the problem—removal of particles from aqueous suspension is addressed by properly designed centrifugation. Particles to be removed are of two types, both differing in meaningful manner from the $SiO_2$ particles which, in aqueous medium, constitute the essential sol. Such particles are either of greater density—e.g., 5.5 gm/cc and 4.5 gm/cc for $ZrO_2$ and $TiO_2$ (relative to the 2.2 gm/cc of $SiO_2$)—or of greater size—typically 1–8 μm for $SiO_2$ agglomerates (relative to the mean size 0.05 μm suspension particles of $SiO_2$).

The essential conditions of centrifugation are well-known. (See, *Encyclopedia of Chemical Technology*, Kirk-Othmer, sec. ed., vol. 4, pp. 710–758 (1964)). Forms of centrifugation include the bottle centrifuge shown in the Figure, as well as apparatus providing for continuous flow. One such apparatus is the "basket" or "tubular" centrifuge in which flow is along the axis of the cylindrical container. Another is the "disc" centrifuge in which flow is parallel to the surfaces of a disc stack. Centrifuging apparatus is considered in detail in the cited reference on pp. 715–717.

Separation—generally in accordance with Stokes Law (p. 713)—is linearly dependent on density difference of the particle relative to the liquid medium and varies as the second power of particle size.

Stokes Law, for a particle settling in the centrifugal field, states:

$$V_s = \frac{\Delta \rho d^2 \omega^2 r}{18\mu}$$

in which:

$V_s$ = settling velocity of a particle in a centrifugal field $\Delta \rho = \rho_s - \rho_L$, the difference between the mass density of the particle and that of the surrounding liquid medium d = diameter of the particle ω = angular velocity of the particle r = radial distance between the axis of revolution and the plane within the sol at which settling velocity is determined.

Accordingly, $ZrO_2$ (5.5 gm/cc density) travels $(5.5-1)/(2.2-1) \times (1 \text{ to } 8)^2/(0.05)^2 = 1500$ to 90,000 times faster than a nominal $SiO_2$ sol particle. Agglomerates of 400 nominal sol particles (accordingly, of size about eight times greater than a single sol particle) travel about fifty times faster than individual particles. As reported in the Examples, one set of operating conditions—centrifuging at 3200 g for thirty minutes—removes $ZrO_2$ particles of size greater than 0.8 μm, together with break-nucleating $SiO_2$ agglomerates, while removing less than 3.5 wt.% of suspension $SiO_2$ (to result in $SiO_2$ depletion well below the critical or crack-nucleating level). Calculation using Stokes equation, modified for hindered settling, indicates that $ZrO_2$, $TiO_2$ and $CrO_3$ particles down to 0.2 μm should be removed.

Other forms of centrifugation equipment—tube as well as disc centrifuge—may be appropriate.

Experimental Procedure

Procedures are based on characteristics of available commercial product. Commonly available material consists of mean sized 0.05 μm $SiO_2$ particles in aqueous suspension. Aggregates which may serve as crack-inducing nuclei consist of at least 400 such particles—to aggregate 0.4 μm (as based on 0.05 μm sol particles). Inclusion of such aggregates is found to lie below 1.0 wt.% in such material. It is necessary to minimize "heterogeneities"—flaws due to inadequate sol $SiO_2$. The minimum $SiO_2$ sol content is about 30 wt.% upon completion of gelation. Experimental experience shows a loss of a maximum of 1% upon proper centrifugation and, therefore, a permitted minimum of 31% before centrifugation. Typical commercial product used in the reported experiments contained 46 wt.% $SiO_2$ as purchased and presented no difficulty. Should more dilute sol be used, this level may become critical.

This disclosure is directed to removal/size reduction of such heterogeneities as inherently present in the sol. The ultimate product—the optical fiber—is a demanding one. Conventional practice designed to avoid contamination from ambient, from unclean surfaces and the like must be followed. The sol-gel process is inherently more susceptible to this source of contamination than are soot-based processes or MCVD. In addition, the sol-gel process is susceptible to contamination from container walls both during the physical separation of the present advance, and during gelation. Data presented in the Examples is based on use of molds which are free of meaningful contaminant to produce fiber which is free of surface or interfacial breaks.

Co-filed U.S. patent application Ser. No. 08/029,753 is directed to procedures for gas removal of particles from the still-porous dried gel. Commercial adoption of procedures for sol purification may be supplemented by such gas removal.

An effective procedure for making sol-gel tubes is described in U.S. Pat. No. 5,240,489, filed Aug. 14, 1992. It is briefly described below. In certain experiments, refractory particles of $ZrO_2$, $TiO_2$ and $Cr_2O_3$ were added to the sol. Characterization of the gel after removal of particles was by direct analysis of impurity content before and after treatment, or by drawing and testing of resulting fiber. Since the critical amount of residual particulate matter is very small, most discriminating test was by fiber break count.

Centrifugation was conducted on a bench top bottle centrifuge as shown in FIG. 1. It consists of four evenly spaced bottles 10, each of approximate dimensions of 4 cm diameter and 10 cm length, to result in capacity of ≈1 liter. Bottles are attached to rotor arms 11, 30 cm in length, in turn, connected with rotor 12, driven by means not shown. As depicted, operation has resulted in sediment ("cake") 13. The apparatus used had a top speed of 3900 rpm, resulting in an acceleration of 3200 g ($3 \times 10^6$ cm/sec$^2$).

A first experiment used centrifuging at 1250 rpm for one hour (Example 2). Following examples used 3900 rpm, the highest speed available on the experimental apparatus, for a period of thirty minutes. After centrifuging, the supernatant liquid was poured off and constituted the sol used for casting. Analysis of the cake was consistent with experimental results based on fiber breaks.

Examples followed uniform practice for formation of the preform and for drawing. The procedure used is briefly set forth.

The overcladding tube was prepared from a 2500 gram aqueous dispersion of fumed silica. The dispersion contained 46 wt.% colloidal silica having a surface area of approximately 50 m$^2$/g. The particle size distribution centered about 50 nm diameter and extended from 5 nm to 200 nm. To the dispersion, a quantity of tetramethylammonium hydroxide (TMAH), (2.8 wt.% based on $SiO_2$—both as dry weight) dissolved in water (25 wt.%), was added. This raised the pH to approximately 12 and stabilized the sol against gelation and sealing. After twenty hours, 0.21 wt.% polyethyloxazoline of molecular weight $\approx$ 50,000 and 0.87 wt. % glycerin (both based on $SiO_2$) were added and mixed with the sol. Methyl formate (2.1 wt.% based on $SiO_2$) was added and the sol was immediately poured into a mold. The mold consisted of an acrylic tube and a concentric stainless steel rod, together providing for a tubular casting of dimensions 63.5 mm OD $\times$ 28.6 mm ID $\times$ 1 meter long. The pH decreased to a value in the 9.6–9.7 range over a ten minute period following addition of the formate to result in substantially complete gelation. Gelation was substantially complete after ten minutes.

The gel tube was removed from the mold and dried horizontally on rotating 2.5" diameter rollers spaced at 3". Rotation at 1 rph for a period of two weeks within a loosely closed box yielded a dried tube, 25.1 mm ID $\times$ 55.6 mm OD $\times$ 844 mm long (corresponding to shrinkage of 12.4%). The reported results were obtained at room temperature and relative humidity of $\approx$ 80%.

The dried tube was placed in a fused quartz firing shroud. The firing shroud was supported on an elevator which moved the sample vertically through a 12" long furnace hot zone. During firing, the body was supported by a 19 mm rod which extended 11.3 cm into the center hole of the unsintered tube. The sample was positioned above the hot zone in a flowing atmosphere of He, $O_2$ and $Cl_2$ while the furnace was heated to the dehydroxylation temperature of 1000° C. The furnace was maintained at this temperature for 16 hours while the sample was slowly lowered through it. After passage, With the sample at the bottom, the furnace temperature was increased to 1400° C. and the sample was consolidated by raising it through the hot zone. As a result of consolidation, the tube shrank an additional 27%, to reduce its internal diameter to 18.3 mm, fusing the tube to the 19 mm support rod. The fused portion, $\approx$ 8 cm long, was removed, leaving a tube of length $\approx$ 59 cm.

A core rod, produced by MCVD, had a $GeO_2$-doped core of refractive index, $\Delta^+ = 0.35\%$ i.e., (above that of undoper silica), a fluorine-doped cladding of index, $\Delta^- = 0.11\%$ - and an outer diameter of 16 min. The rod was inserted into the tube. Fabrication of the composite preform was on a vertical lathe equipped with a surface burner. A vacuum of 25–27 inches of mercury aided in collapse of the sol-gel tube onto the core rod. The assembly was rotated at 10 rpm and fused, top-down, at a rate of 1.2 cm/minute. Overcladding temperature was sufficient to accomplish several objectives: (1) removal of any remaining pores in the sol-gel tube, (2) collapse of the tube onto the core rod, and (3) fusion at the tube-core rod interface. The resulting preform had a 2.6 mm diameter core and 40 mm OD. Preparation details were otherwise in accordance with the teaching of U.S. Pat. No. 4,820,332.

The preform was drawn to fiber 125 $\mu$m diameter using an r.f., $ZrO_2$ induction furnace operating at 2200° C. The draw speed was 3.9 meters per second and the tension during drawing was 75 grams. Dual coatings of UV-curable acrylate was applied. The drawn fiber, exclusive of coatings, had a core of 8.2 $\mu$m and outer diameter of 125 $\mu$m.

Insertion loss, as measured on selected samples, was comparable with best available commercial fiber — <0.4 dB/km at 1.3 $\mu$m and <0.22/km at 1.55 $\mu$m.

Measurements chosen for reporting in the Examples where the result of sediment analysis—analysis of the first "layer" to be deposited. Energy Dispersive Spectra X-ray analysis of the underside of the cake as removed from the bottle senses to a depth of about 25 $\mu$m. For these purposes, that 25 $\mu$m thickness is considered as the "layer". Certain Examples report time of centrifugation. The time reported is that required to yield cake of essentially maximum attainable thickness under reported centrifugation conditions. The number of $SiO_2$ suspension particles should not be reduced to such extent as to significantly disrupt processing and result in breaking of the gel body during drying. Maintenance of 30 wt.% sol particles was found adequate. In Examples in which time of sedimentation was measured, deposition rate remained substantially constant for a substantial period. This, in itself, lends insight into the centrifugation process—initial sedimentation is largely of higher density and larger size particles. Since sedimentation rate does not change during this initial period, it must be concluded that arrival time of more slowly traveling particles somehow compensates for initial preference for more rapidly traveling particles. Any drop-off in rate would indicate unwanted dilution of the sol. Centrifugation should be terminated prior to drop-off.

Examples differ with regard to particle separation, which, where used, took the form of the bottle centrifugation described in connection with the FIGURE. Example 1, serves as a baseline—made use of an unprocessed sol (an as-prepared sol from which nothing was removed and to which nothing was added). Other of the Examples used a sol which was deliberated doped with particulate contaminant of varying size and composition.

Examples are set forth in tabular form.

EXAMPLES

| Example No. | Added Contaminant | Centrifugation Time | Acceleration* | Cake Analysis+ | Layer Deposition Time$\Delta$ | Proof Test kpsi | Number Internal Breaks |
| --- | --- | --- | --- | --- | --- | --- | --- |
| 1 | None | — | None | | | 20 | 2/0.2 km |
| 2 | None | 1 hr | 1250 g | | | 60 | 4/12 km |
| 3 | None | 0.5 hr | 3200 g | $TiO_2$ | 1 min | | |
| 4 | 5 $\mu$m $ZrO_2$ | 0.5 hr | 3200 g | 95% $ZrO_2$ | 2 min | 100 | 63/2 km |
| 5 | 1 $\mu$m $ZrO_2$ | 0.5 hr | 3200 g | 95% $ZrO_2$ | 3–4 min | 100 | 23/2 km |
| 6 | 0.8 $\mu$m $Cr_2O_3$ | 0.5 hr | 3200 g | 95% $Cr_2O_3$ | 4–5 min | 100 | 9/0.5 km |

-continued

| Example No. | Added Contaminant | Centrifugation Time | Acceleration* | Cake Analysis+ | Layer Deposition TimeΔ | Proof Test kpsi | Number Internal Breaks |
|---|---|---|---|---|---|---|---|
| 7 | 1 μm TiO$_2$ | 0.5 hr | 3200 g | 95% TiO$_2$ | 4 min | 100 | 0/4 km |

*Values of acceleration presented are average values - they are based on a particle at median height in the bottle.
The effective lever arm is about 15 inches (12 in. long arm + half the length of the 5 inch bottle).
+Reaminder of cake was SiO$_2$ in all instances.
ΔLayer following this showed no contaminant.

Discussion as well as Examples have been directed to the first likely commercial adaptation of sol-gel fiber fabrication-that based on fiber drawing from a composite preform constituted of a sintered sol-gel tube containing an inserted core rod. The advance is equally applicable to alternatives including those in which the tube is sintered about an already-contained core rod, as well as to procedures in which the overcladding is gelled about the rod. The advance is of value in reducing fiber breakage in fiber drawn from all such composite preforms as well as from preforms which are totally sol-gel dreived.

We claim:

1. Process for fabrication of optical fiber in accordance with which fiber is drawn from a preform comprising a sol-gel body, in which the sol-gel body is prepared by gelation of a sol followed by drying to a porous body and finally by sintering, and in which the sol comprises suspension particles of SiO$_2$ in water, in which suspension particles are primarily of size within the range of from 0.005 μm to 0.2 μm CHARACTERIZED in that the sol is further processed to remove contaminant particles on the basis of at least one characteristic selected from the group consisting of density greater than that of such suspension particles and size larger than that of such suspension particles, in which further processing comprises centrifugation, settling, or filtration, and in which further processing results in substantial separation of refractory particles, in which refractory refers to particles which are not assimilated in resulting fiber.

2. Process of claim 1 in which further processing comprises centrifugation.

3. Process of claim 2 in which centrifugation results in substantial separation both of refractory particles and of any agglomerates of size≧2 μm of suspension particles.

4. Process of claim 3 in which refractory particles include at least one composition selected from the group consisting of ZrO$_2$, TiO$_2$, and Cr$_2$O$_3$.

5. Process of claim 1 in which the sol-gel body is tubular, and in which the preform consists essentially of a rod-shaped body encompassed by such sol-gel body.

6. Process of claim 5 in which such sol-gel body as sintered is a self-supporting tubular body into which such rod-shaped body is inserted to result in the preform.

7. Process of claim 6 in which such rod-shaped body is prepared by a procedure selected from the group consisting of Modified Chemical Vapor Deposition and a soot process, further in which such soot process is selected from the group consisting of Vapor Axial Deposition and Outside Vapor Deposition.

8. Process of claim 5 in which such sol-gel body is sintered in the presence of an inserted rod-shaped body.

* * * * *